C. R. DAHL.
PULLEY FOR AUTOMOBILES.
APPLICATION FILED APR. 20, 1917.

1,266,220.

Patented May 14, 1918.

WITNESSES
W. C. Fielding
L. B. Middleton

INVENTOR
Carl R. Dahl
BY Richard Owen
ATTORNEY

UNITED STATES PATENT OFFICE.

CARL REUBEN DAHL, OF MURDOCK, MINNESOTA.

PULLEY FOR AUTOMOBILES.

1,266,220.

Specification of Letters Patent.  Patented May 14, 1918.

Application filed April 20, 1917.  Serial No. 163,488.

*To all whom it may concern:*

Be it known that I, CARL REUBEN DAHL, a citizen of the United States, residing at Murdock, in the county of Swift and State of Minnesota, have invented certain new and useful Improvements in Pulleys for Automobiles, of which the following is a specification.

This invention relates to new and useful improvements in attachments for automobiles and the principal object of the invention is to provide means for detachably engaging one of the drive wheels, whereby the automobile may be used as a stationary engine to drive machinery of various kinds.

Another object of the invention is to provide a pulley having means for attaching the same to an automobile wheel, without necessitating any change to said wheel.

Another object of the invention is to so form the pulley that the belt-carrying part thereof is located well to the side of the automobile, so that the fender will not interfere with the belt.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1:
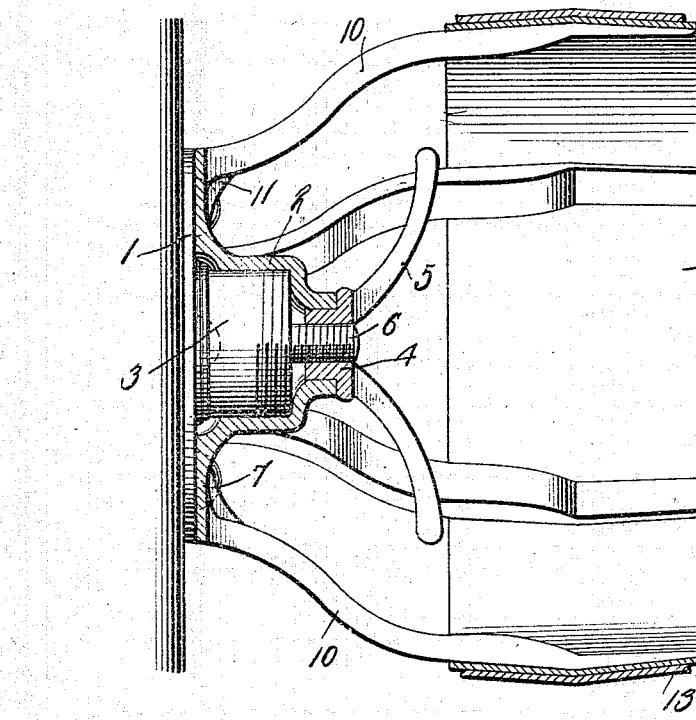
Figure 1 is a sectional view, showing the invention applied to an automobile wheel.
Figure 2:
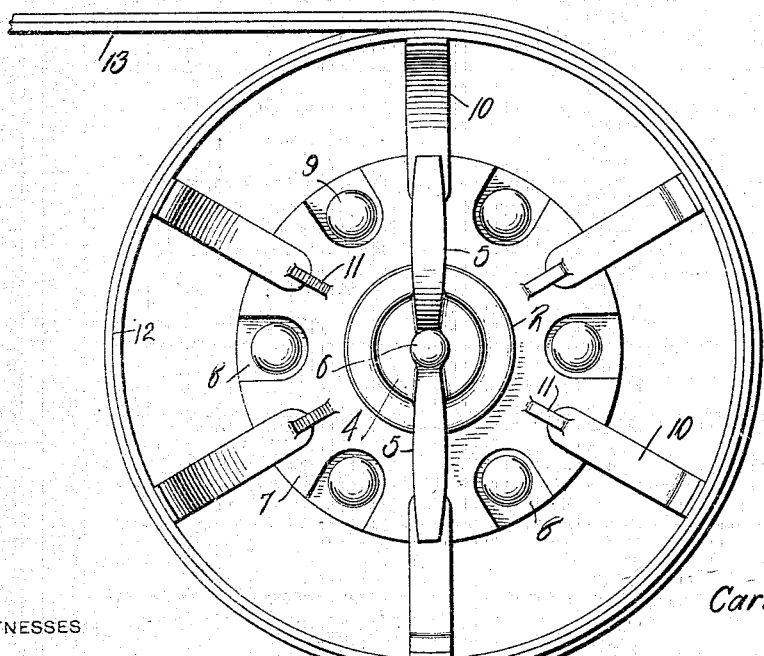
Fig. 2 is a side view thereof.

In these figures, 1 indicates a part of an automobile wheel hub, with the hub cap and axle bur removed so as to receive the securing means of the pulley. This pulley consists of the cylindrical part 2 made to fit the projecting part 3 of the wheel. This part 2 is open at both ends and a nut 4 provided with wings 5 is adapted to operate in the outer open end of the part 2. This nut is screw threaded to engage the screw threaded spindle 6 of the axle. 7 indicates a flat annular part secured to the hub 2 and having slots 8 therein adapted to fit over the heads of the bolts 9 in the hub of the wheel. 10 indicates the spokes of the pulley extending outwardly from the edge of the said flat portion and these spokes are provided with strengthening webs 11 connecting them to the flat portion and the spokes are curved outwardly to make the pulley proper, indicated by the reference numeral 12, of the correct size. In other words, the greater the curve of these spokes, the larger the diameter of the pulley will be. The spokes are of such length as to throw the pulley well beyond the automobile wheel, so that the belt 13 will be free of the said wheel and the fender of the automobile.

The pulley may be easily and quickly applied to the automobile by simply removing the hub cap and the axle bur and then placing the pulley with the slots 8 over the bolts in the hub and screwing the wing nut 4 on the axle spindle.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. An attachment for automobiles comprising a pulley, and a nut engaging with the screw threaded spindle of the rear axle to hold the pulley to the wheel.

2. An attachment for automobiles comprising a pulley, a nut engaging with the screw threaded spindle of the rear axle to hold the pulley to the wheel and means on the pulley engaging with a part on the wheel.

3. An attachment for automobiles comprising a pulley, a nut engaging with the screw threaded spindle of the rear axle to hold the pulley to the wheel, said pulley having slots therein for engaging with the bolt heads in the hub of the automobile wheel.

4. An attachment for automobiles comprising a pulley, a hub formed to embrace the projecting part of the hub of the rear wheel of an automobile, a nut for engaging with the spindle of the rear axle, and a belt-carrying part secured to said hub.

5. An attachment for automobiles comprising a pulley, a nut engaging with the screw threaded spindle of the rear axle to hold the pulley to the wheel, said pulley having abutments for engagement with the automobile wheel for preventing rotational movement of the pulley with relation to the automobile wheel.

6. An attachment for automobiles comprising a pulley, and a member adapted for screw threaded engagement with the automobile wheel spindle to secure the pulley thereto.

7. An attachment for automobiles comprising a member formed to engage the projecting part of the automobile wheel hub and having an open outer end, a nut adapted to operate in said end for engagement with the screw threaded spindle of the rear automobile wheel, and a pulley rim secured to said member.

8. An attachment for automobiles comprising a member formed to engage the projecting part of the automobile wheel hub, means acting therewith to secure the attachment of said member to the automobile wheel, outwardly flaring spokes carried by said member adjacent its outermost edges, and an annulus secured to the free ends of said spokes.

In testimony whereof I affix my signature in presence of two witnesses.

CARL REUBEN DAHL.

Witnesses:
C. J. DAHL,
FREDA DAHL.